United States Patent
Rioux et al.

(10) Patent No.: US 12,072,983 B2
(45) Date of Patent: Aug. 27, 2024

(54) LANGUAGE-INDEPENDENT APPLICATION MONITORING THROUGH ASPECT-ORIENTED PROGRAMMING

(71) Applicant: Veracode, Inc., Burlington, MA (US)

(72) Inventors: Christien R. Rioux, Somerville, MA (US); Robert Anthony Layzell, Novato, CA (US)

(73) Assignee: Veracode, Inc., Burlington, MA (US)

( * ) Notice: Subject to any disclaimer, the term of this patent is extended or adjusted under 35 U.S.C. 154(b) by 636 days.

(21) Appl. No.: 17/287,045

(22) PCT Filed: Apr. 24, 2020

(86) PCT No.: PCT/US2020/029707
§ 371 (c)(1),
(2) Date: Apr. 20, 2021

(87) PCT Pub. No.: WO2021/216079
PCT Pub. Date: Oct. 28, 2021

(65) Prior Publication Data
US 2022/0075875 A1    Mar. 10, 2022

(51) Int. Cl.
*G06F 21/57*    (2013.01)
*G06F 8/30*    (2018.01)
(Continued)

(52) U.S. Cl.
CPC ............ *G06F 21/577* (2013.01); *G06F 8/316* (2013.01); *G06F 8/43* (2013.01); *G06F 11/3612* (2013.01)

(58) Field of Classification Search
CPC ........ G16H 10/20; G16H 10/60; G16H 30/20; G16H 30/40; G16H 80/00; G16H 50/20; G06F 21/6245; H04L 63/0421
See application file for complete search history.

(56) References Cited

U.S. PATENT DOCUMENTS

| 8,990,779 B2 | 3/2015 | Schalk |
| 2005/0138207 A1* | 6/2005 | Chen .................. G06F 9/454 709/246 |

(Continued)

FOREIGN PATENT DOCUMENTS

| EP | 2246783 A1 | 11/2010 |
| EP | 2587401 A1 * | 5/2013 ............. G06F 21/52 |

OTHER PUBLICATIONS

Haupt, et al., "Virtual Machines Support for Aspect-Oriented Programming Languages", Dissertation, Darmstadt University of Technology, Dec. 16, 2005, 240 pages (Year: 2005).*

(Continued)

*Primary Examiner* — Khoi V Le
(74) *Attorney, Agent, or Firm* — Gilliam IP PLLC

(57) ABSTRACT

To support adding functionality to applications at a layer of abstraction above language-specific implementations of AOP, a language for implementing AOP facilitates runtime monitoring and analysis of an application independent of the language of the application. Aspects can be created for applications written in any supported language. Program code underlying implementations of aspects can be executed based on detecting triggering events during execution of the application. Routines written with the AOP language comprise event-based aspect code triggers that indicate an event which may occur during execution of the application and the associated aspect code to be executed. An agent deployed to a runtime engine to monitor the application detects events and evaluates contextual information about the detected events against the aspect triggers to determine if aspect code should be executed to perform further monitoring and analysis of the executing application.

20 Claims, 8 Drawing Sheets

(51) Int. Cl.
*G06F 8/41* (2018.01)
*G06F 11/36* (2006.01)

(56) References Cited

U.S. PATENT DOCUMENTS

| | | | | |
|---|---|---|---|---|
| 2010/0094936 A1* | 4/2010 | Simonen | ................ | G06T 19/00 |
| | | | | 709/204 |
| 2011/0041121 A1* | 2/2011 | Schalk | .................... | G06F 8/316 |
| | | | | 717/127 |
| 2011/0145399 A1* | 6/2011 | Jeyapaul | ................ | H04L 41/28 |
| | | | | 709/224 |
| 2013/0111310 A1* | 5/2013 | de Oliveira | ............ | G06F 21/52 |
| | | | | 714/811 |
| 2018/0276059 A1* | 9/2018 | Lopata | ................ | G06F 9/44521 |
| 2019/0354414 A1* | 11/2019 | Bailey | ....................... | G06F 9/54 |

OTHER PUBLICATIONS

Haupt, etal., "Virtual Machines Support for Aspect-Oriented Programming Languages", Dissertation, Darmstadt University of Technology, Dec. 16, 2005, 240 pages (Year: 2005) (Year: 2005).*
PCT Application Serial No. PCT/US2020/029707, International Search Report, mailed Jul. 9, 2020, 2 pages.
PCT Application Serial No. PCT/US2020/029707, Written Opinion, mailed Jul. 9, 2020, 10 pages.
Haupt, et al., "Virtual Machines Support for Aspect-Oriented Programming Languages", Dissertation, Darmstadt University of Technology, Dec. 16, 2005, 240 pages.
Pinto, et al., "LARA as a Language-Independent Aspect-Oriented Programming Approach", Association for Computing Machinery, Proceedings of the Symposium on Applied Computing, retrieved on Nov. 5, 2019 from http://ibispo.eu/pubs/SAC2017_preprint.pdf, Apr. 2017, pp. 1623-1630.

* cited by examiner

LANGUAGE-INDEPENDENT APPLICATION MONITORING THROUGH ASPECT-ORIENTED PROGRAMMING

TECHNICAL FIELD

The disclosure generally relates to the field of data processing, and to software development, installation, and management.

BACKGROUND ART

Aspect-oriented programming (AOP) can be used to add functionality to existing programs. AOP provides for separation of cross-cutting concerns which may impact more than one application module, such as logging and security. With AOP, aspects are created to encapsulate cross-cutting concerns to add functionality to a program without modifying the underlying business logic of the program. AOP is generally implemented for a target language as a language extension or external library which supports creation of aspects in the target language (e.g., AspectC++ for C++).

BRIEF DESCRIPTION OF THE DRAWINGS

Embodiments of the disclosure may be better understood by referencing the accompanying drawings.

DESCRIPTION OF EMBODIMENTS

Figure 1:
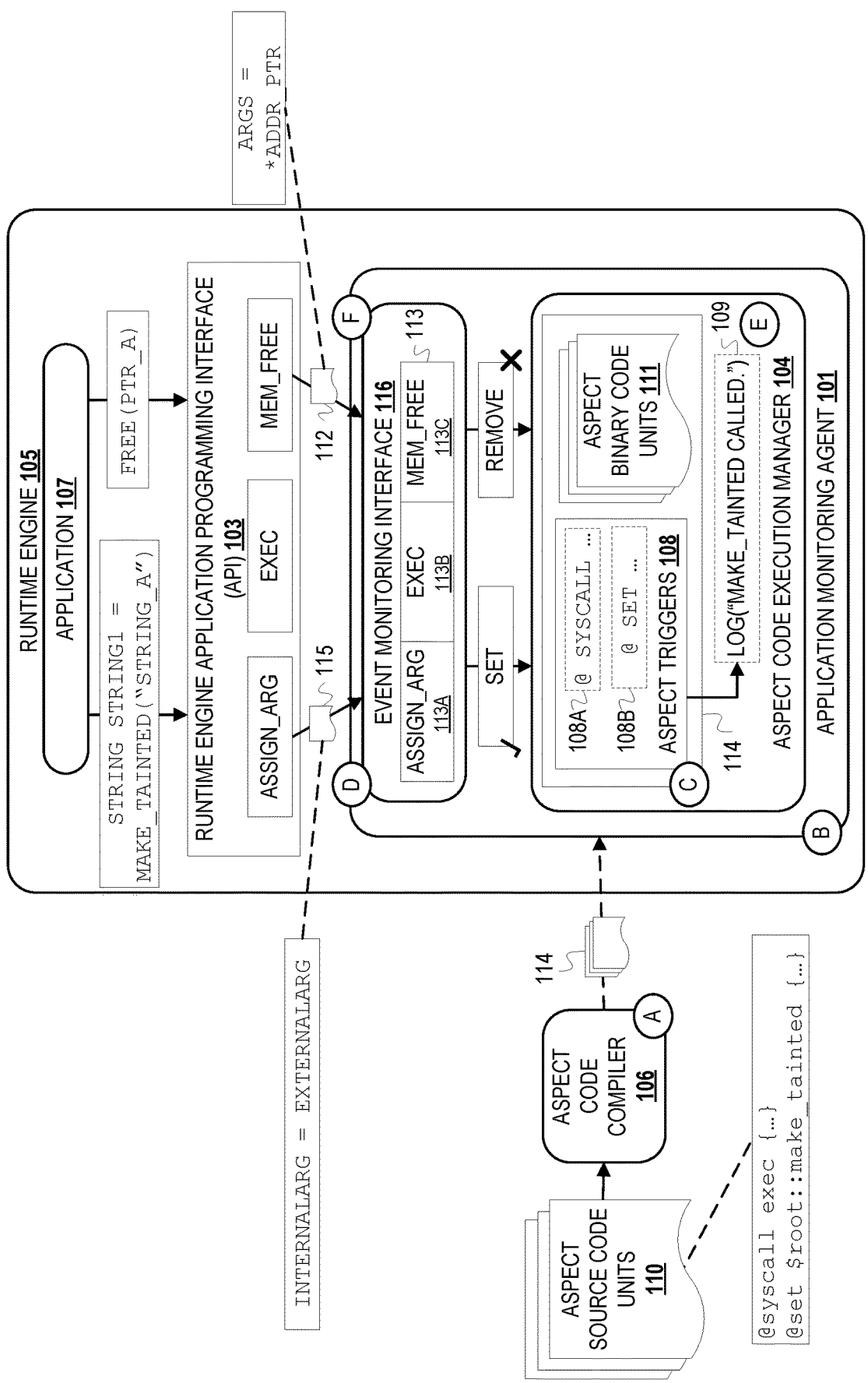
FIG. 1 depicts a conceptual diagram of analyzing events occurring during execution of an application at runtime to determine whether to execute aspect code units for monitoring and analysis of the application.

The description that follows includes example systems, methods, techniques, and program flows that embody parts of the disclosure. However, it is understood that this disclosure may be practiced without these specific details. For instance, this disclosure refers to implementing AOP for an application written in the Java® programming language or JavaScript® programming language without modifying code units (e.g., single library files, collections of library files, standalone routines or subroutines, etc.) of the application in illustrative examples. Parts of this disclosure can be instead applied to applications written in any high-level programming language for which a runtime engine is provided for execution of applications. In other instances, well-known instruction instances, protocols, structures and techniques have not been shown in detail in order not to obfuscate the description.

Overview

To support adding functionality to existing applications at a layer of abstraction above language-specific implementations of AOP, a universal language for implementing AOP ("AOP language") has been developed to facilitate runtime monitoring and analysis of an application independent of the language in which the application is written. Using the AOP language, aspects can be created for applications written in any of several supported languages as a result of abstract representations of routines, operators, and other constructs common to potential languages of applications to be analyzed which are defined with the language. This reduces the amount of language-specific knowledge which is conventionally a requisite for implementing additional functionality for existing applications by leveraging AOP. Program code underlying the aspects which are implemented (or "aspect code") can be executed based on detecting triggering events during execution of the application in a runtime engine, such as invocation of specified functions, operators, or other functionality which is to be monitored.

Routines written with the AOP language comprise event-based aspect code triggers that indicate an event which may occur during execution of the application and the associated aspect code which is to be executed based on detection of the indicated event. An event-based aspect code trigger (hereinafter "aspect trigger") includes an indication of an event which may be an event type and/or event identifier. An aspect trigger may trigger may also indicate one or more criteria for triggering execution of aspect code. An execution criterion for an aspect trigger can be defined with respect to data and/or metadata associated with an event. An aspect trigger can also be defined for multiple events and criteria.

After deployment of an agent to the runtime engine to monitor an application and loading aspect code to be accessible to an agent for corresponding aspect triggers, the agent detects events and evaluates aspect triggers based on the detected events. As the agent detects events occurring during execution of the application, the agent obtains and evaluates contextual information (the data and/or metadata that may be evaluated against the trigger criteria) associated with the detected events against the aspect triggers to determine if aspect code should be executed and, if so, determines the aspect code to execute. The agent can thus determine whether detected events are "of interest" and trigger execution of aspect code to perform further monitoring and analysis of the executing application based on the contextual information satisfying the trigger criteria. Adding functionality to an application with AOP at runtime by leveraging an agent which can determine whether a detected event is of interest and identifies and executes the associated aspect code rather than modifying the code of the application itself with the aspect code increases flexibility of the AOP implementation and prevents modifications to the application under analysis.

Example Illustrations

FIG. 1 depicts a conceptual diagram of analyzing events occurring during execution of an application at runtime to determine whether to execute aspect code units for monitoring and analysis of the application. FIG. 1 depicts a runtime engine 105 provided for execution of an application 107. The runtime engine 105 may be any runtime engine which manages and provides resources for execution of an application. For example, the runtime engine 105 may be a Java Virtual Machine (JVM) for execution of Java applications, a Common Language Runtime (CLR) for execution of .NET applications, a JavaScript engine for execution of JavaScript applications, etc. The runtime engine 105 provides a runtime engine application programming interface ("API") 103 which provides an interface between the application 107 and the lower-level functionality performed by the runtime engine 105. The API 103 can be invoked during execution of the application 107 as the runtime engine 105 performs operations to manage the execution of the application 107. For instance, the runtime engine 105 can invoke the API 103 to communicate with the operating system (e.g., via system calls), perform lower-level functions underlying the higher-level functions of the application 107 (e.g., memory allocation and deallocation), etc. FIG. 1 also depicts an application monitoring agent ("agent") 101 which is loaded into the runtime engine 105. An aspect code execution manager 104 and event monitoring interface 116 execute on the agent 101. The event monitoring interface 116 creates "hooks," or associations between events corresponding to target functions of the API 103 and an event evaluation function(s) which is to execute upon detection of an event, by which events corresponding to target functions of the API 103 can be monitored. The aspect code execution manager 104 evaluates events detected during execution of the application 107 to determine if corresponding binary code units for monitoring and analyzing execution of the application 107 should execute.

FIG. 1 also depicts aspect source code units 110 and compiled aspect code units 114. The aspect source code units 110 are a source code implementation comprising one or more code units written in a high-level language for implementing AOP, or the "AOP language," independent of the language of the runtime engine 105 and the application 107. For instance, the aspect source code units 110 may be an implementation of functionality for logging, security, etc. with which functionality of the application 107 can be augmented. The aspect source code units 110 also indicate one or more events which may be detected during execution of the application 107 corresponding to invocations of the API 103 that trigger execution of instructions corresponding to the aspects which have been defined with the AOP language, also referred to herein as "aspect triggers." Aspect triggers indicated in the aspect source code units 110 can indicate an event type and/or event identifier. The aspect triggers indicated in the aspect source code units 110 can also include at least a first criterion for triggering execution of the associated aspect code, or a "trigger criterion." Examples of events which can be indicated in the aspect triggers of the aspect source code units 110 with an event type or identifier include function calls and/or returns, package loading, memory allocations and deallocations, and set/get/remove operations, for example. The trigger criterion can be a name of a function, package, object, etc. and/or wildcard characters which may be associated with the event type, for example. The compiled aspect code units 114 are the compiled binary code representation of the instructions indicated in the aspect source code units 110.

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, an aspect code compiler 106 compiles the aspect source code units 110 to generate the compiled aspect code units 114. Events which trigger execution of a corresponding aspect binary code unit(s) can be indicated in the aspect source code units 110 by an aspect trigger. Aspect triggers are denoted with a particular element of the AOP language, such as a symbol, keyword, delimiter, etc., which can be recognized by the aspect code compiler 106. FIG. 1 depicts the at sign (@) as denoting aspect triggers in the aspect source code units 110 as example syntax of the AOP language, though other symbols or keywords may be used. The aspect triggers specified with the AOP language element can thus be considered to facilitate an implementation of an event mechanism at the agent 101, where aspect triggers indicate the events which are to trigger an action by the agent 101 (i.e., actions based on execution of aspect binary code). The events indicated in the aspect triggers in the aspect source code units 110 can be indicated by certain keywords in the AOP language, such as types of "call," "return," and "set." In this example, the aspect source code units 110 include two aspect triggers: a system call to "exec" and a set operation of a variable with a value returned from a function named "make_tainted" which "taints" a value, object, or other data which is provided as a parameter. The function "make_tainted" is provided as an example function for manipulation of data by an untrusted source during execution of the application 107 and may thus be indicative of a vulnerability of the application 107. In these examples, the aspect triggers correspond to events of type "syscall" and "set," with the function names "exec" and "make_tainted" provided as trigger criteria, respectively. The aspect code compiler 106 compiles the aspect source code units 110 to binary code to generate compiled aspect code units 114, where the compiled aspect code units 114 comprise aspect binary code units 111 corresponding to the instructions to be executed and aspect triggers 108 which trigger execution of those instructions. While the aspect code compiler 106 compiles both aspect triggers and the corresponding instructions indicated in the aspect source code units 110 to binary, FIG. 1 distinguishes the aspect triggers 108 from the aspect binary code units 111 generated from compiling the aspect source code units 110 for clarity.

At stage B, the agent 101 is loaded into the runtime engine 105. The agent 101 is loaded into the same process as the process created for execution of the application 107 which has been loaded into the runtime engine 105. The agent 101 can be loaded into the runtime engine 105 based on the language of the runtime engine 105. For instance, if the runtime engine 105 is a JavaScript runtime engine, the agent 101 may be loaded by executing a "require" script which includes a module name of the agent 101 or file path to the agent 101 module as an argument. Upon load of the agent 101, the agent 101 and the application 107 can execute in parallel or concurrently. The event monitoring interface 116 of the agent 101 then creates monitoring hooks 113A, 113B, 113C (collectively the "hooks 113A-C") which correspond to target functions of the API 103. Each of the hooks 113A-C indicate a respective target function of the API 103 which may be invoked during execution of the application 107 in the runtime engine 105. The hooks 113A-C associate events corresponding to target functions of the API 103 with a function which handles the respective event. The event monitoring interface 116 creates the hooks 113A-C such that the agent 101 is notified of the events as they occur (e.g., upon a call to or return from a target function) and detection of the events triggers an event evaluation. For instance, the hooks 113A-C can comprise event handler functions which are "hooked" to (i.e., associated with based on pointers) the respective target functions. As another example, the hooks 113A-C can comprise event handler callback functions registered for the respective target functions. Because the AOP language is independent of the language of the runtime engine 105, the event monitoring interface 116 provides an interface by which the agent 101 can determine an "abstraction" of the events which are detected to facilitate evaluation of the events. The agent 101 can be said to determine an abstraction of events via the event monitoring interface 116 because different target functions corresponding to different potential target languages (i.e., of the runtime engine 105) can be mapped back to the same event representation maintained by the agent 101 indicated in the compiled aspect code units 114.

At stage C, the aspect code execution manager 104 "registers" the compiled aspect code units 114. The compiled aspect code units 114 are also loaded into the runtime engine 105 for access by the aspect code execution manager 104 (e.g., as a result of static linking or dynamic linking of aspect code units with the agent 101). For instance, object files associated with the aspect source code units 110 which were generated by the aspect code compiler 106 may have been linked with object files of the agent 101, and the compiled aspect code units 114 are thus loaded into the runtime engine 105 with the load of the agent 101. Registration of the compiled aspect code units 114 refers to determining events for which to monitor based on the aspect triggers 108 which indicate events that trigger execution of corresponding ones of the aspect binary code units 111 upon detection. In this example, the aspect code execution manager 104 registers the aspect triggers 108, which were denoted with the at sign in the corresponding source code representation, and associates indications of the aspect triggers 108 (e.g., identifiers, indicators, etc. for the event type and/or event criteria) with the corresponding ones of the aspect binary code units 111 for which execution can be triggered upon detecting the corresponding event. The aspect code execution manager 104 can register the aspect triggers 108 based on loading (i.e., importing) the compiled aspect code units 114. For instance, upon load of a first of the compiled aspect code units 114, the aspect code execution manager 104 can execute the aspect code unit until a statement corresponding to one of the aspect triggers 108 is encountered and subsequently registers the aspect trigger based on executing the corresponding statement. The aspect code execution manager 104 registers the aspect trigger based on associating an indication of the event that is identified by the aspect trigger with the corresponding one of the aspect binary code units 111. For example, the aspect code execution manager 104 can associate an identifier(s) corresponding to the event type and the one or more event criterion identified in the aspect trigger with a pointer to the corresponding one of the aspect binary code units 111 to execute upon detecting the event.

In this example, the aspect triggers 108 comprise an aspect trigger 108A and an aspect trigger 108B. The aspect code execution manager 104 determines that the aspect trigger 108A and the aspect trigger 108B have been defined, which correspond to event types of a system call and a set operation (e.g., an assignment operator invocation), respectively. The aspect code execution manager 104 also determines the criteria included in the aspect triggers 108 which indicate the names of the system call and value set that are to trigger execution of the corresponding aspect binary code units. The aspect code execution manager 104 identifies the respective one(s) of the aspect binary code units 111 which is to execute as a result of detecting an event corresponding to each of the aspect triggers 108 and associates indications of the events corresponding to each of the aspect triggers 108 with the respective aspect binary code unit (e.g., based on associating an indication of the trigger with a pointer to the aspect binary code unit). For instance, the aspect code execution manager 104 can determine a location in memory of the aspect binary code unit(s) of the aspect binary code units 111 which corresponds to each of the aspect triggers 108 and associates a pointer to the aspect binary code unit with the event type and event criterion determined for the corresponding aspect trigger.

At stage D, the event monitoring interface 116 detects an invocation of a function of the API 103 called "assign_arg," or a memory allocation underlying an assignment operation, as an event which triggers the hook 113A (e.g., invokes the event handler, callback, etc. corresponding to the hook 113A). The event monitoring interface 116 obtains a context 115 associated with the executing application 107 at the time of the invocation of "assign_arg" as a result of the triggering of the hook 113A. Contexts such as the context 115 comprise data and/or metadata about the API 103 invocations which trigger a respective one of the hooks 113A-C, such as a parameter(s) passed into and/or return value from the target function of the API 103 which was "hooked." The context 115 may also indicate additional data and/or metadata about execution of the application 107, such as stack trace information, the current line of program code which is executing, etc. This data and/or metadata may be accessible to the event monitoring interface 116 or may be obtained by the event monitoring interface 116 based on invoking a function(s) of the API 103. For instance, the context 115 may be passed to the event handler of the event monitoring interface 116 corresponding to the hook 113A as a parameter and/or the event handler can comprise program code for determining stack trace information, thread execution data, or other execution information associated with the API 103 invocation event. In this example, the context 115 at least indicates the left and right operands of the "assign_arg" invocation. Upon detection of an event through triggering of one of the hooks 113A-C, the event monitoring interface 116 determines the abstracted representation of the event type as defined by the AOP language to which the detected event "maps." In this example, the event monitoring interface 116 determines that the invocation of the target function "assign_arg" corresponds to a set event and communicates the set event and context 115 to the aspect code execution manager 104.

The aspect code execution manager 104 determines whether the set operation which triggered the hook 113A is an event which is "of interest" and thus should trigger execution of a corresponding one(s) of the aspect binary code units 111. The aspect code execution manager 104 can determine whether the set operation event is of interest based on determining whether one of the aspect triggers 108 which was registered upon load of the agent 101 indicates that execution of an aspect binary code unit(s) should be triggered based on detecting a set operation in which memory is allocated for a variable which has been assigned a value of a function named "make_tainted." For instance, the aspect code execution manager 104 can evaluate the set event against the registered indications of the aspect triggers 108 (hereinafter referred to as the aspect triggers 108) to determine whether one of the aspect triggers 108 corresponds to an aspect trigger for a same event type as the type of the detected event, or the event with type "set," with a trigger criterion indicating a function name of "make_tainted." The aspect code execution manager 104 can evaluate the set event against the aspect triggers 108 based on evaluation of the context 115 against the trigger criterion indicated in the aspect triggers 108. In this example, the aspect code execution manager 104 determines that the set event satisfies the aspect trigger 108B. The aspect code execution manager 104 subsequently determines a corresponding one of the aspect binary code units 111, depicted as aspect binary code unit 109, which it is to execute. For instance, the aspect code execution manager 104 may identify a location in memory of the aspect binary code unit 109 which was determined during the initial registration of the aspect binary code unit 109. The aspect code execution manager 104 may also construct an object which includes the contextual information of the event indicated in the context 115 based on determining that the set event satisfies the aspect trigger 108B. The object which includes the contextual information included in the context 115 can then be accessed during execution of the aspect binary code unit 109 (e.g., based on scoping of the context 115 object and aspect binary code unit 109).

At stage E, the aspect code execution manager 104 performs an action for monitoring and/or analysis of the application 107 indicated by the aspect binary code unit 109 based on execution of the aspect binary code unit 109. The aspect binary code unit 109 comprises aspect binary code for monitoring and/or analysis of execution of the application 107 by the agent 101. For example, the aspect binary code unit 109 can comprise instructions for logging the instance of the set operation of the value returned from the function "make_tainted." The aspect binary code unit 109 may also comprise instructions for tracking the memory which is allocated as a result of the "make_tainted" invocation to facilitate monitoring of data which may pose a security risk. The tainted data for which the memory was allocated can thus be monitored during subsequent execution of the application 107 based on taint tracking information which the aspect code execution manager 104 stores on the agent 101 (not depicted in FIG. 1). The aspect code execution manager 104 may also indicate a result of execution of the aspect binary code unit 109. For instance, the aspect code execution manager 104 can generate data for tracking the tainted data and generate a report or notification indicating the tracking information and/or information from the context 115 (e.g., the stack trace). Execution of the aspect binary code unit 109 thus facilitates monitoring and analysis of the application 107 without modifying the code units of the application 107.

At stage F, the event monitoring interface 116 detects an invocation of the API 103 for deallocation of memory, such as for a garbage collection operation, as an event which triggers the hook 113C (e.g., invokes the event handler, callback, etc. corresponding to the hook 113C). The event monitoring interface 116 obtains a context 112 associated with the executing application 107 at the time of the memory deallocation event. The context 112 can indicate a pointer to the memory address to be deallocated which was passed into the deallocation function as a parameter, for example. The context 112 may also include other data and/or metadata about execution of the application 107, such as information which the event monitoring interface 116 can obtain by calling a function(s) of the API 103 as similarly described at stage D. Upon detection of the event based on triggering of the hook 113C, the event monitoring interface 116 determines an abstraction of the memory deallocation event type which is defined by the AOP language. In this example, the event monitoring interface 116 determines that the invocation of the target function for memory deallocation corresponds to a "remove" event and communicates the remove event and context 112 to the aspect code execution manager 104. The aspect code execution manager 104 then evaluates the remove event based on the context 112 to determine whether the event is "of interest" and thus should trigger execution of a corresponding one(s) of the aspect binary code units 111. The aspect code execution manager 104 can determine whether the event is of interest based on evaluating the remove event against the aspect triggers 108 to determine if one of the aspect triggers 108 indicates that execution of a respective aspect binary code unit should be triggered based on detecting a remove event. For instance, the aspect code execution manager 104 may determine whether a type of the remove event and event data and/or metadata of the context 112 match an event type/identifier and satisfy a trigger criterion indicated in one of the aspect triggers 108.

In this example, because no aspect trigger was defined for remove events, the aspect code execution manager 104 determines that the remove event does not satisfy any of the aspect triggers 108. The aspect code execution manager 104 thus does not determine that any of the aspect binary code units 111 should be executed based on the failure to satisfy the triggers for aspect binary code unit execution, and the flow of execution returns to the application 107. Evaluation of events at the agent 101 to determine whether to execute aspect binary code units provides for a flexible AOP implementation where aspects can be created or modified as events which are considered "of interest" change. This also provides an abstraction layer between the agent 101 functionality and the AOP implementation, as a developer can create, remove, or modify the aspect source code units 110 without also modifying the corresponding functionality of the agent 101.

While FIG. 1 depicts an example in which the aspect source code units 110 are compiled (i.e., the AOP language is a compiled language), in other implementations, the AOP language may be an interpreted language. For instance, in implementations in which the aspect code execution manager 104 comprises an interpreter, the aspect code execution manager 104 can execute aspect code by interpreting the aspect source code units 110 based on parsing the aspect source code units 110, interpreting an intermediate representation of the aspect source code units 110, or "translated aspect code units," etc. The aspect code units to be interpreted are loaded into the runtime engine 105 and made accessible to the aspect code execution manager 104 for interpretation. Upon detection of an event which corresponds to a first of the hooks 113A-C by the event monitoring interface 116 and communication of the event to the aspect code execution manager 104, the aspect code execution manager 104 can evaluate the event to determine whether the event triggers interpretation of at least a first aspect code unit, and if so, identifies the aspect code unit corresponding to the trigger satisfied by the detected event. The aspect code execution manager 104 subsequently can execute the identified aspect code unit through interpretation of the aspect code unit.

Figure 2:
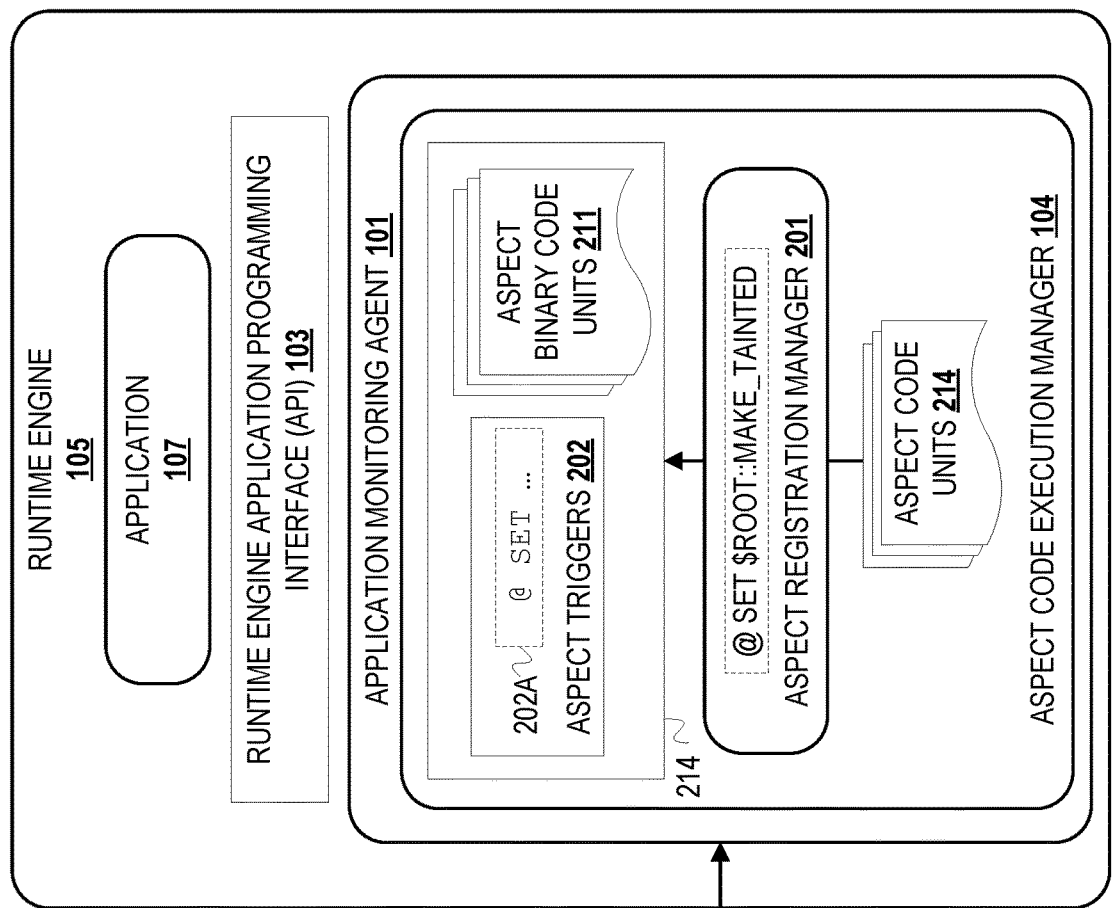
FIG. 2 depicts a conceptual diagram of registering aspect code units which indicate "nested" aspect triggers with an agent executing in a runtime engine.

FIG. 2 depicts a conceptual diagram of registering aspect code units which indicate "nested" aspect triggers with an agent executing in a runtime engine. As described in reference to FIG. 1, registration of aspect code units refers to determining the events for which to monitor based on the aspect triggers indicated in aspect code units which are accessible to the agent. FIG. 2 depicts the agent 101 with the aspect code execution manager 104 loaded into the runtime engine 105 as described in reference to FIG. 1. FIG. 2 also depicts an aspect registration manager 201 which executes on the agent 101. The aspect registration manager 201 handles registration of aspect code units 214 with the aspect code execution manager 104. The aspect code units 214 comprise aspect source code units which have been compiled to binary as similarly described in reference to FIG. 1; however, in other implementations in which the AOP language is an interpreted language, the aspect code units 214 may comprise parsed aspect source code units or translated aspect code units. The aspect code units 214 which have been compiled and loaded into the runtime engine 105 comprise aspect triggers and the associated instructions, depicted as aspect triggers 202 and aspect binary code units 211, respectively. The operations depicted in FIG. 2 can be performed after the agent 101 has been loaded into the runtime engine 105.

In this example, the aspect code units 214 comprise nested aspect triggers, depicted as an aspect trigger 202A and an aspect trigger 202B. The aspect trigger 202A corresponds to a set operation in which memory is allocated for a variable which is assigned a value returned from a function named "make_tainted," with an event type of "set" and a trigger criterion of a function name "make_tainted." The aspect trigger 202B corresponds to a function return event in which the function "make_tainted" returns, with an event type of "return" and a trigger criterion of a value "Value" returned from "make_tainted." The event corresponding to the aspect trigger 202B occurs after the event corresponding to the aspect trigger 202A as indicated by the nesting of the aspect triggers 202A, 202B. Execution of aspect binary code corresponding to the aspect trigger 202B is thus conditioned on first detecting the event associated with the aspect trigger 202A. While the syntax of the AOP language depicted in FIG. 2 is provided as an illustrative example, syntax can vary among implementations of the AOP language.

Upon load of the agent 101, the aspect registration manager 201 determines the events which trigger execution of aspect code based on load of the aspect code units 214 (e.g., based on importing the aspect code units 214). The aspect code units 214 comprise indications of events which trigger execution of aspect code, or triggering events, depicted as aspect triggers 202. The aspect triggers 202 correspond to triggering events which were denoted with a particular element of the AOP language in the corresponding source code representation. In this example, the aspect registration manager 201 determines that the aspect code units 214 comprise an aspect trigger 202A and registers the aspect trigger 202A by associating an indication of the aspect trigger 202A with the corresponding instructions (e.g., based on a pointer to the aspect code unit associated with the instructions). However, in this example, the aspect registration manager 201 does not also register the aspect trigger 202B during the initial registration of the aspect code units 214. In some implementations in which the aspect code units 214 include nesting of aspect triggers, the aspect registration manager 201 registers the "top-level" aspect trigger, or the aspect trigger of the outermost scope, during initial determination of the events for which to monitor based on the aspect triggers. In this example, the aspect trigger 202A is a top-level aspect trigger.

The aspect code execution manager 104 can subsequently determine the aspect binary code unit to execute following detection of the event corresponding to the aspect trigger 202B during execution of the application 107 after first detecting the event corresponding to the aspect trigger 202A. For instance, in the example depicted in FIG. 2, the aspect code execution manager 104 may first detect an event which corresponds to the aspect trigger 202A (i.e., a set of a value returned from a function named "make_tainted"). The aspect code execution manager 104 can then perform a logging operation based on execution of the respective aspect binary code unit and/or tag the memory associated with the "make_tainted" value return and can subsequently identify the aspect trigger 202B, for which the respective aspect binary code unit will execute upon return from the function "make_tainted." In general, the aspect registration manager 201 can register top-level aspect triggers instead of each nested aspect trigger during the initial registration of aspect code units to reduce overhead associated with registration of the aspect code units. This also prevents execution of aspect binary code units associated with inner aspect triggers until an event associated with the top-level aspect trigger has first been detected.

Figure 3:
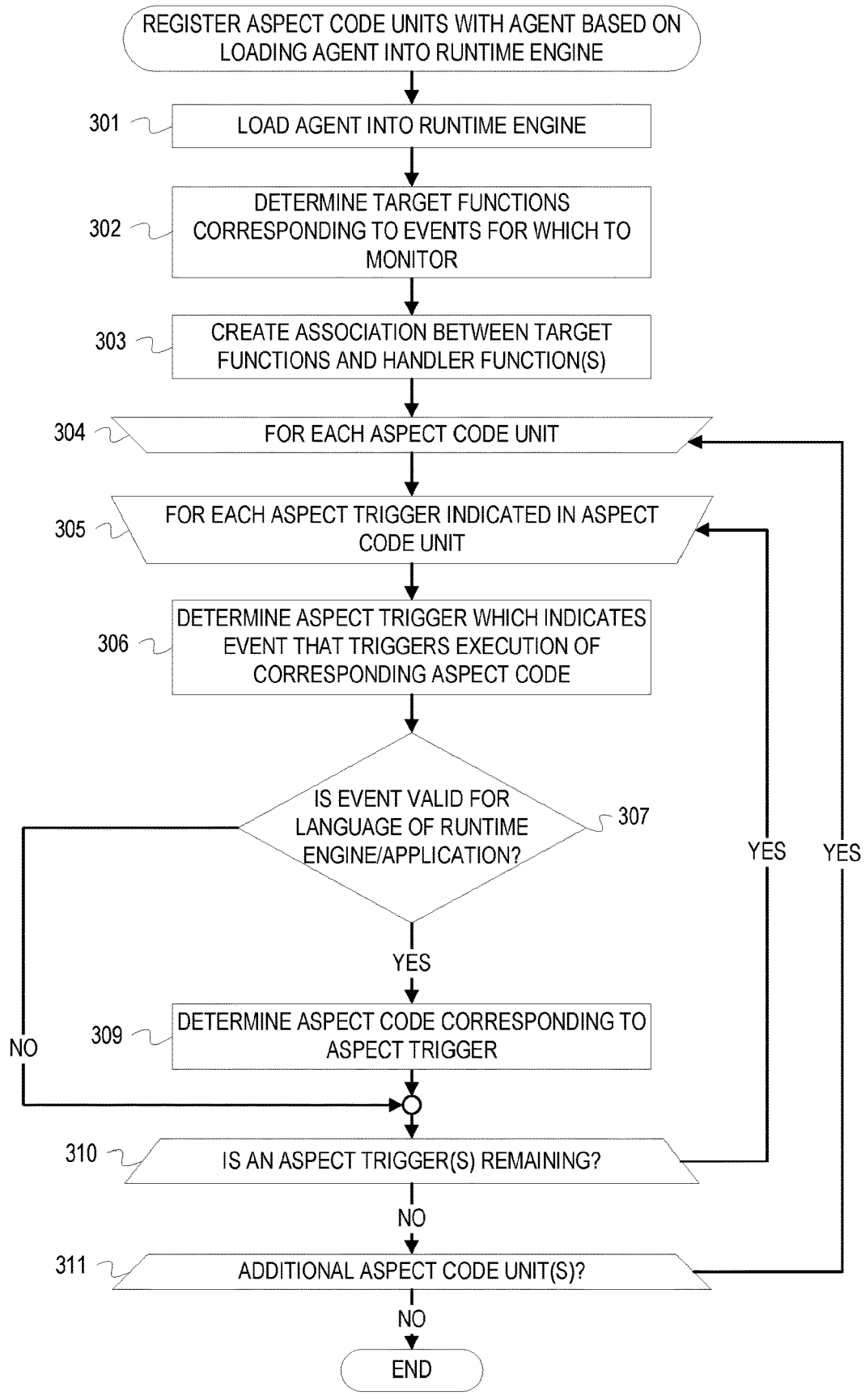
FIG. 3 is a flowchart of example operations for registering aspect code units with an agent upon loading the agent into a runtime engine.

FIG. 3 is a flowchart of example operations for registering aspect code units with an agent upon loading the agent into a runtime engine. As described in reference to FIG. 1, the aspect code units comprise code units written in a language for implementing AOP independent of the underlying language of an application under analysis and the runtime engine in which it executes. The example operations depicted by blocks 302 and 303 are performed by an agent once the agent has been loaded into the runtime engine. The example operations depicted by blocks 304 through 311 are performed by an aspect registration manager which also executes on the agent. The operations performed by each of the agent and the aspect registration manager are depicted as being performed sequentially, though the respective operations may be performed concurrently in some implementations. The example operations refer to an aspect registration manager as performing the depicted operations for consistency with FIG. 2, although naming of software and program code can vary among implementations. While the example operations describe registration in reference to aspect binary code units, the operations can also be applied to implementations in which the AOP language is implemented as an interpreted language and the aspect registration manager registers aspect source code units or translated aspect code units.

At block 301, the agent is loaded into the runtime engine. The agent on which the aspect registration manager is installed can be an agent for runtime application monitoring for one of a plurality of potential target languages of the application. For instance, the agent may be an agent to be loaded into a runtime engine provided for execution of JavaScript applications, a runtime engine provided for execution of Java applications (i.e., a JVM), etc. The agent is loaded into the runtime engine based on the language of the runtime engine. For example, the agent can be loaded into a runtime engine for execution of JavaScript applications by executing a "require" script which includes the agent or a file path to the agent as the module name. As another example, the agent can be loaded into a JVM as a Java native agent. The aspect binary code units are also loaded into the runtime engine and are accessible to the agent (e.g., as a result of linking object code of the aspect code units with object code of the agent). The agent "registers" with the runtime engine to receive events as a result of the load into the runtime engine. For instance, upon load into a JVM, the agent can receive events as a result of being loaded as a Java native agent.

At block 302, the agent determines target functions of an API associated with the runtime engine for which the agent is to monitor. Invocations of target functions of the runtime engine API can be communicated to the agent as events. The target functions may be calls to or returns from certain functions, functions for setting or obtaining values of member variables (e.g., get/set functions), and/or functions provided for loading a package, for example. Target functions can be defined in an interface corresponding to the language of the runtime language maintained by the agent for monitoring for events. For instance, function headers and corresponding code stubs (i.e., method stubs) can be defined for each of the target functions corresponding to the language of the runtime engine and made accessible to the agent, such as through statically linking object code of the agent with the object code of the function headers and stubs or through the agent loading a shared library which includes the function headers and code stubs at runtime. The function headers and stubs provide an interface between the agent and the runtime engine such that event handlers can be implemented independent of the language of the runtime engine (e.g., as native functions). A function header and corresponding code stub defined for a target function may indicate a name of the target function, parameter(s), a return type, etc. The code stubs are accessible to the agent, such as based on linking object code generated from compiling the source code of the code stubs with the object code generated from compiling the agent source code. The agent can determine the target functions to monitor for based on determining the target functions for which a function header and code stub was defined for the corresponding runtime engine language.

At block 303, the agent creates an association between the target functions and respective event handler function. The association between each target function and event handler facilitates event detection by the agent. The associations are created such that upon an invocation of a target function, the agent can detect the invocation of the target function as an event and perform initial event processing. For instance, the agent can maintain an event handler function for handling each event, or each target function invocation. The agent can "hook" each target function to the associated event handler function based on pointers to the target function and event handler function. As another example, the agent can register the event handler functions as callbacks which are called upon invocation of the associated target function. The event handler functions can be implemented as the functionality underlying each of the function headers and code stubs described at block 302 such that the function headers and code stubs provide the interface between the target functions and corresponding event handler functions. Each event handler function may comprise program code for determining an event type as defined with the AOP language, where event types defined with the AOP language are a higher-level representation of language specific events which may be detected. As an example, an event handler function which is "hooked" for memory allocation events can determine that invocations of the "new" operator and variable declarations and assignment of values map back to an event type of "set."

At block 304, the aspect registration manager begins "registering" aspect triggers for each aspect code unit of the aspect code units which have been loaded into the runtime engine. The aspect code units may have been loaded into the runtime engine based on static linking of object code of the agent and object code of the aspect code units when generating the agent executable or may be dynamically loaded upon load of the agent into the runtime engine, for example. The aspect registration manager "registers" an aspect trigger based on determining the event for which to monitor indicated by the aspect triggers and the corresponding aspect code to be executed based on detecting the event. Aspect triggers were previously indicated with an AOP language element used for denoting triggering events to be registered that is recognized by a compiler which compiles programs written in the AOP language. The aspect code unit for which the aspect registration manager is currently registering aspect triggers is hereinafter referred to as "the aspect code unit."

At block 305, the aspect registration manager of the agent begins determining each aspect trigger indicated in the aspect code unit. An aspect code unit may include one or more aspect triggers which were initially denoted in the aspect source code with an element of the AOP language reserved for denoting triggering events. The aspect registration manager can determine aspect triggers based on importing the aspect code unit at agent load time. For instance, upon agent load, the aspect registration manager can begin to execute the aspect code unit based on importing the aspect code unit until a statement which comprises an aspect trigger is encountered and executed. Aspect triggers thus indicate to the aspect registration manager that the statement comprises an indication of an event and should be registered upon execution.

At block 306, the aspect registration manager determines an aspect trigger which indicates an event that triggers execution of at least a first corresponding aspect binary code unit. The aspect registration manager determines the indication of the event based on a language element or keyword/reserved word of the AOP language which was used to denote an aspect trigger, such as the at sign in the example described in reference to FIG. 1. If nested aspect triggers are present (e.g., as described in reference to FIG. 2), the aspect registration manager may determine the top-level aspect trigger instead of each of the nested aspect triggers. The aspect registration manager can also identify an event type or identifier associated with the aspect trigger. For instance, an event type may be a keyword, such as "syscall" and "set" which correspond to a system call and assignment, respectively, as depicted in FIG. 1. Other criteria for event data and/or metadata may be indicated in the aspect trigger, such as a name of a function which is invoked, a criterion for a parameter(s) passed into the function, etc.

At block 307, the aspect registration manager determines if the event indicated by the aspect trigger is valid for the language of the application and runtime engine. Because the AOP language can be used to implement aspects independent of the language of the runtime engine and application, the same program code for monitoring and analysis of an application can be written with the AOP language for target applications of different languages. As a result, aspects implemented with the AOP language may reference abstractions of language elements or constructs which are applicable to a subset of the languages and thus may not pertain to the application actually under analysis (e.g., generics in Java and .NET; classes in Ruby, .NET, and Java, etc.). If the aspect registration manager identifies such a language element or construct not supported by the language of the application or runtime engine based on evaluating the aspect trigger, the aspect registration manager may not proceed with registration of the aspect trigger and associated aspect code since the execution-triggering functionality will not be observed during execution of the application. For instance, the aspect registration manager can maintain a set of policies for the target language of the application and runtime engine which indicate event types and potential event criterion which are valid for the target language. An example set of policies which the aspect registration manager maintains for JavaScript as a target language could indicate that if generics are indicated in the aspect trigger as a trigger criterion, the aspect registration manager is to "skip" registration of the associated aspect code because generics do not exist in JavaScript. The aspect registration manager can evaluate the event indicated by the aspect trigger against the policies to determine whether the event is valid. If the event is valid for the language of the runtime engine and application, operations continue at block 309. If the event is not valid for the language, operations continue at block 310.

At block 309, the aspect registration manager determines the aspect code which corresponds to the aspect trigger. For instance, the aspect registration manager may determine a memory address of the unit of aspect code which is to be executed after detecting the event specified by the aspect trigger (i.e., the unit of aspect code which comprises the instructions corresponding to the trigger). The aspect code which corresponds to the aspect trigger is the aspect code which is within the scope block of the aspect trigger. The aspect registration manager can associate an indication of the aspect trigger with an indication of the unit of aspect code which was identified as corresponding to the aspect trigger (e.g., by associating the memory address of the unit of aspect code with the aspect trigger).

At block 310, the aspect registration manager determines if an aspect trigger remains. The aspect registration manager can determine if an aspect trigger remains based on a determination of whether each of the top-level aspect triggers indicated in the aspect code unit has been considered. If an aspect trigger is remaining for registration of the aspect code unit, operations continue at block 304. If no aspect triggers remain, operations continue at block 311.

At block 311, the agent determines if additional aspect code units remain for registration. If additional aspect code units remain to be registered, operations continue at block 304. If no aspect code units remain to be registered, operations are complete.

Figure 4:
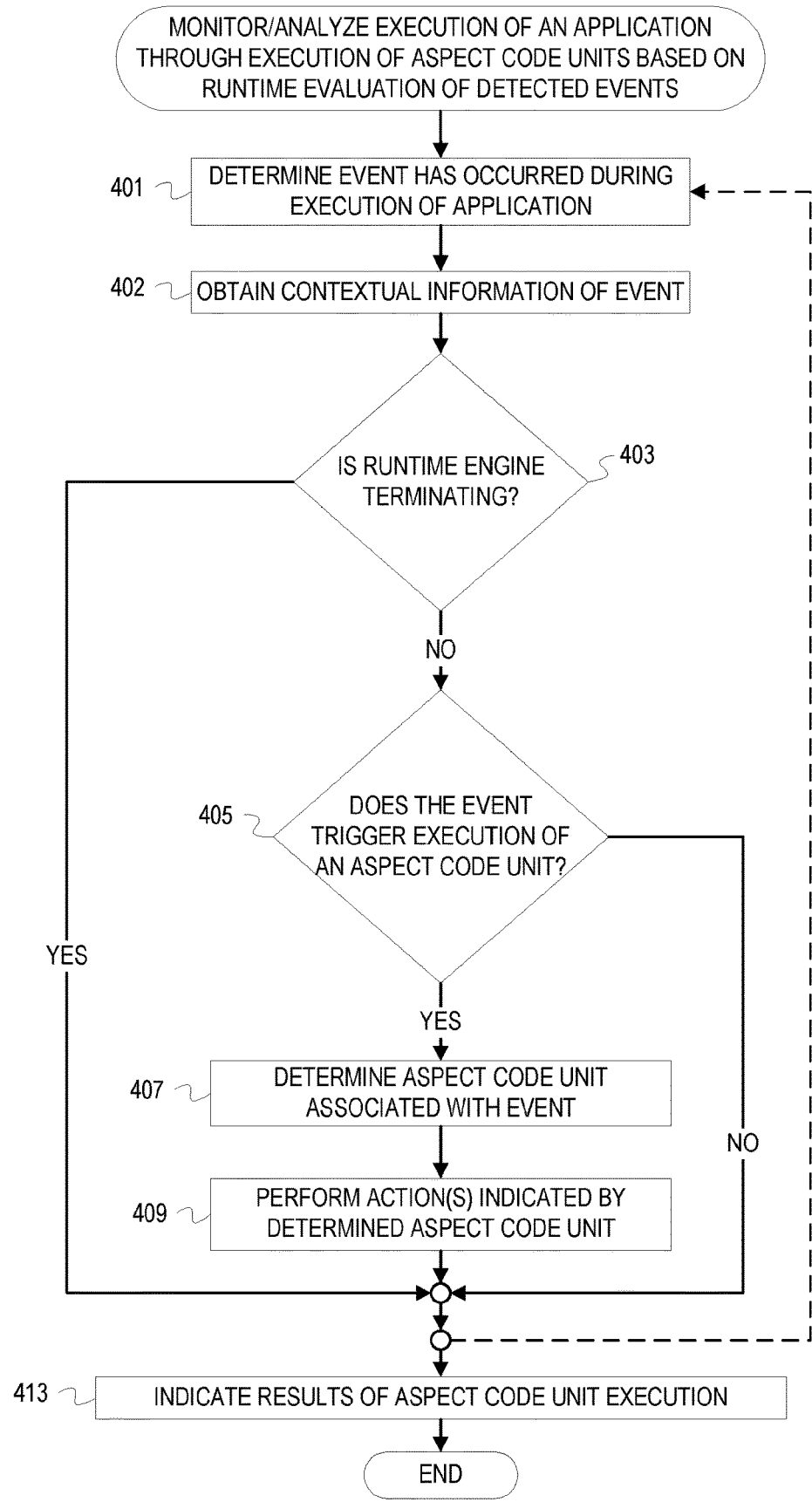
FIG. 4 is a flowchart of example operations for monitoring and/or analyzing execution of an application through execution of aspect code units based on runtime evaluation of detected events.

FIG. 4 is a flowchart of example operations for monitoring and/or analyzing execution of an application through execution of aspect code units based on runtime evaluation of detected events. The example operations refer to an aspect code execution manager (hereinafter "execution manager") which executes on an agent loaded into a runtime engine as performing the depicted operations for consistency with FIG. 1, although naming of software and program code can vary among implementations. While the example operations refer to execution of aspect binary code units, the operations can also be applied to implementations in which aspect code units (e.g., aspect source code units, translated aspect code units, etc.) are interpreted.

At block 401, the execution manager determines that an event has occurred during execution of the application. The event corresponds to an invocation of a target function of an API associated with the runtime engine. Examples of events include calls to and returns from functions of the API, system calls and returns from system calls, package/module load events (e.g., import operations), and set, get, and remove operations. The execution manager is invoked upon detection of an event or may receive an indication of the detected event as a request to evaluate the detected event. For instance, the execution manager may be invoked by an event listener/handler which forwards an indication of the event to the execution manager for further evaluation. The indication of the event which the execution manager receives may comprise an "abstracted" (i.e., high level) representation of the event corresponding to the target function which is associated with the language of the runtime engine. For example, the execution manager may receive an indication that a "load" event for package import operations has occurred, where the detected load event may have corresponded to an import statement, require statement, etc. which was executed.

At block 402, the execution manager obtains contextual information of the event. The contextual information comprises data and/or metadata of the event. For instance, the contextual information can include a value of a parameter(s) passed into and/or a return value from a function of the runtime engine API which the execution manager obtains upon detection of the event. The contextual information can also indicate information about execution of the application in the runtime engine, such as current stack trace information, the line of code from which execution was redirected, and thread execution information. The data and/or metadata included in the contextual information may be data and/or metadata which were passed into a callback or event listener/handler invoked upon detection of the event. Alternatively or in addition, the data and/or metadata may be obtained by calling a function(s) of the runtime engine API.

As depicted by block 403, operations continue depending on whether the runtime engine is terminating, in which the detected event corresponds to a runtime engine termination event. The execution manager can be "notified" of termination of the runtime engine based on detection of a runtime engine termination event. For instance, the execution manager can listen for events corresponding to termination of the runtime engine, application shutdown, etc. While not depicted in this example, the execution manager can perform additional aspect binary code unit execution after detection of the runtime engine termination event (e.g., as described in reference to the operations performed at blocks 405-409). If the runtime engine is not yet terminating, operations continue at block 405. If the runtime engine is terminating, operations continue at block 413.

At block 405, the execution manager determines whether the event triggers execution of at least a first aspect binary code unit. The execution manager determines whether the event triggers execution of an aspect binary code unit based on a set of aspect triggers, or indications of events which trigger aspect binary code unit execution, which the execution manager determined upon agent load, such as the aspect triggers 108 described in reference to FIG. 1. Events indicated in aspect triggers can be considered to correspond to the subset of events which may potentially be determined to occur during execution of the application (e.g., at block 401) which are to trigger execution of a corresponding aspect binary code unit for further monitoring or analysis of the executing application at the time of the event. Each of the aspect triggers indicates an event which the execution manager can detect, such as with an event type or identifier. The aspect triggers may also indicate one or more criterion for the event data and/or metadata, such as a name of a function, package, or object. The execution manger can evaluate the contextual information obtained for the event against the aspect triggers to determine whether an aspect trigger has been defined with an event type and criterion which is satisfied by event data and/or metadata determined from the context. Upon determining that the event satisfies a first of the aspect triggers, the execution manager determines that the event triggers execution of a corresponding one of the aspect binary code units. Evaluation of an event against aspect triggers for execution of aspect binary code units is further described in reference to FIG. 5. If the event triggers execution of an aspect binary code unit, operations continue at block 407. If the event does not trigger execution of an aspect binary code unit, operations continue at block 413.

At block 407, the execution manager determines the aspect binary code unit associated with the event based on the aspect trigger. The execution manager can determine a location in memory of the aspect binary code unit which corresponds to the event (e.g., based on a memory address stored in a pointer). The execution manager may have determined a location in memory of each of the aspect binary code units corresponding to an aspect trigger during aspect code unit registration and associated the location in memory with the aspect trigger. The execution manager can thus determine the aspect binary code unit which was associated with the aspect trigger during the initial registration of aspect code units. The execution manager may also create an object which comprises the data and/or metadata of the event indicated in the contextual information, or a "context object," which is within the scope of the determined aspect binary code unit such that the contextual information can be accessed during execution of the aspect binary code unit.

At block 409, the execution manager performs at least a first action which is indicated in the determined aspect binary code unit as a result of execution of the aspect binary code unit. The aspect binary code unit comprises an implementation of at least a first aspect which facilitates monitoring and/or analysis of execution of the application. The execution manager can leverage information included in the context object associated with the event during execution of the aspect binary code unit. For instance, the execution manager may log the detected event and/or may label, tag, etc. data which the application uses that pose a security risk to facilitate tracking of the data as a result of execution of the aspect binary code unit. As another example, the aspect code execution manager can determine whether data associated with the event has previously been labeled or tagged to determine the presence of an application vulnerability as a result of execution of the aspect binary code unit. Operations then continue at block 401, where the execution manager can determine the occurrence of a subsequently occurring event.

At block 413, the execution manager indicates one or more results of aspect binary code unit execution. The execution manager can indicate the results by generating a report, notification, etc. which includes results from monitoring and analyzing execution of the application based on executing the aspect binary code units. For instance, the execution manager can generate a report which indicates at least a first application vulnerability which was identified based on tracking data which were identified as a potential security issue. Alternatively or in addition, the execution manager may also present the contents of a log file by which the detected events were recorded, report event information to a data gathering service, etc.

Figure 5:
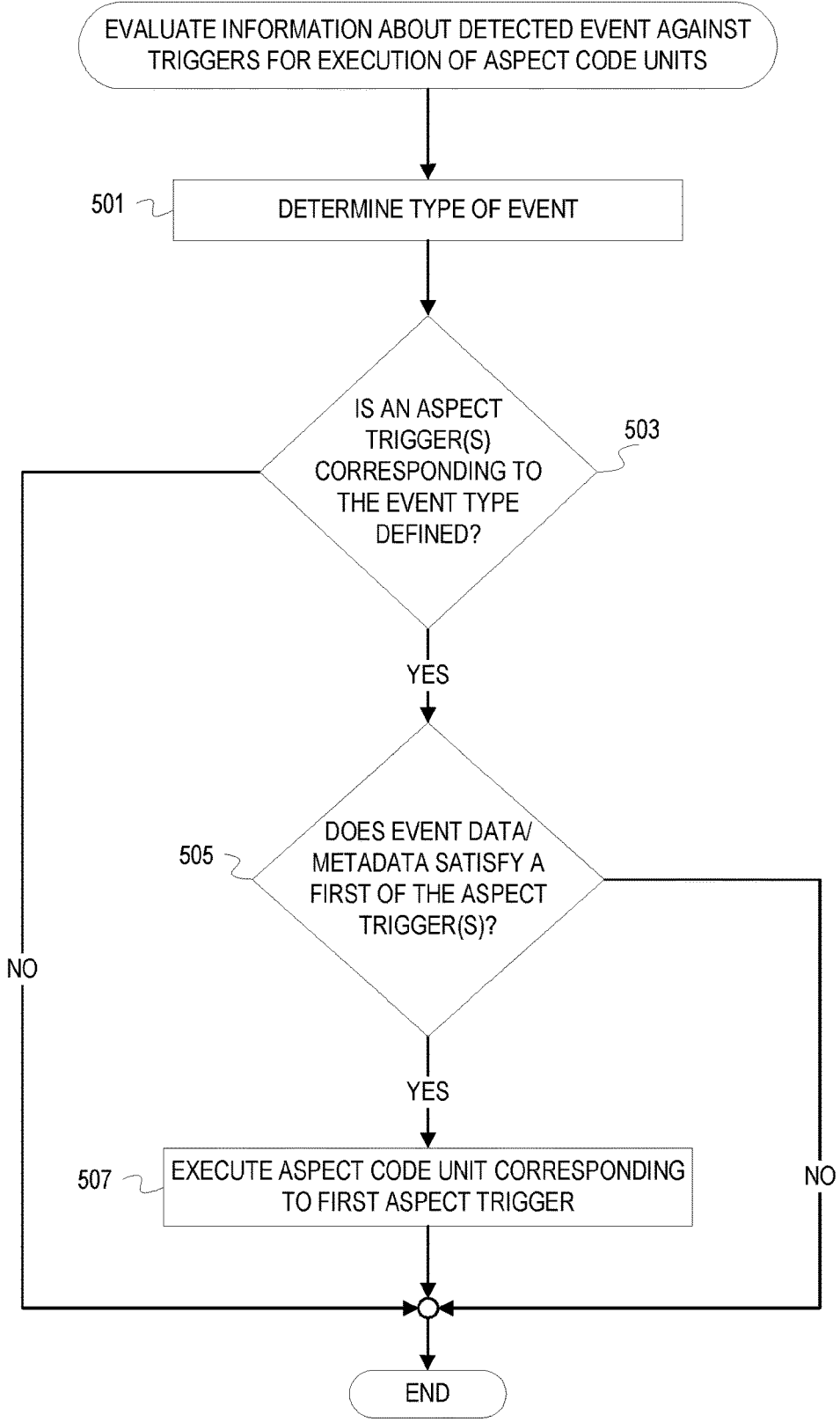
FIG. 5 is a flowchart of example operations for evaluating information about detected events against triggers for execution of aspect code units.

FIG. 5 is a flowchart of example operations for evaluating information about detected events against triggers for execution of aspect code units (e.g., aspect binary code units). The example operations refer to an aspect code execution manager (hereinafter "execution manager") which executes on an agent loaded into a runtime engine as performing the depicted operations for consistency with FIG. 1, although naming of software and program code can vary among implementations. The depicted operations can be performed after the execution manager is notified of an event which prompts an event evaluation by the execution manager.

At block 501, the execution manager determines a type of the event. Examples of event types include function calls, function returns, and set, get, or remove operations which correspond to target functions of an API. The event type can be communicated to the execution manager upon detection of the event. As an example, the agent can maintain event handlers or callbacks corresponding to each event type (i.e., corresponding to each target function), where events are detected based on invocations of the event handlers or callbacks. The event handler which was invoked upon detection of the event notifies the execution manager of the event detection and communicates the event type to the execution manager with the notification. Alternatively or in addition, the execution manager can determine the type of the event based on contextual information associated with the event which the execution manager obtains. Contextual information can indicate parameters and return values, call stack information, thread execution data, or other information about execution of the application at the time of the event. The event type can be considered an abstracted representation of the target function of the API corresponding to the detected event. The event type can be considered an abstraction of the language-specific target function because the execution manager's representation of events is independent of the target language, and names of target functions for different target languages can "map" back to the same event type at the execution manager. As an example, with reference to FIG. 1, the memory allocation event detected as a result of the invocation of the assignment operator can be abstracted as an event with type "set."

At block 503, the execution manager determines whether one or more aspect triggers corresponding to the event type have been defined. The execution manager previously determined one or more aspect triggers which were specified in aspect code units. Each of the aspect triggers indicates an event which may occur during execution of the application (e.g., with an event type, event identifier, etc.). Each aspect trigger may also indicate at least a first trigger criterion which can be satisfied by data and/or metadata associated with the event. The execution manager evaluates contextual information of the event against the aspect triggers to determine if one or more of the aspect triggers indicates an event that matches the event type determined at block 501. If at least a first aspect trigger corresponding to the event has been defined, operations continue at block 505. If an aspect trigger corresponding to the event has not been defined, operations are complete.

At block 505, the execution manager determines whether data and/or metadata associated with the event satisfy a first of the aspect triggers. The execution manager can determine if the data and/or metadata associated with the event satisfy a first of the aspect triggers identified at block 503 based on evaluation of the contextual information against the trigger criterion in indicated in the aspect trigger(s). If more than one aspect trigger indicating the determined event type was identified, the execution manager can evaluate the contextual information against each of the aspect triggers to determine if the contextual information satisfies a first of the aspect triggers. If the event data and/or metadata satisfy a first aspect trigger, operations continue at block 507. If the event data and/or metadata do not satisfy a first aspect trigger, operations are complete.

At block 507, the execution manager executes the aspect code unit corresponding to the first aspect trigger. The execution manager can determine the aspect code unit to be executed based on the aspect trigger which the event was determined to satisfy (e.g., based on a memory address of the aspect code unit determined to correspond to the aspect trigger during aspect code unit registration). The execution manager may also create a context object which is accessible to the aspect code unit that indicates the contextual information of the event. The execution manager can then perform an action(s) for monitoring or analyzing the executing application indicated by the aspect code unit based on determining that the event satisfied the aspect trigger, such as logging, security checking, or performing further evaluation of the data and/or metadata associated with the event.

Figure 6:
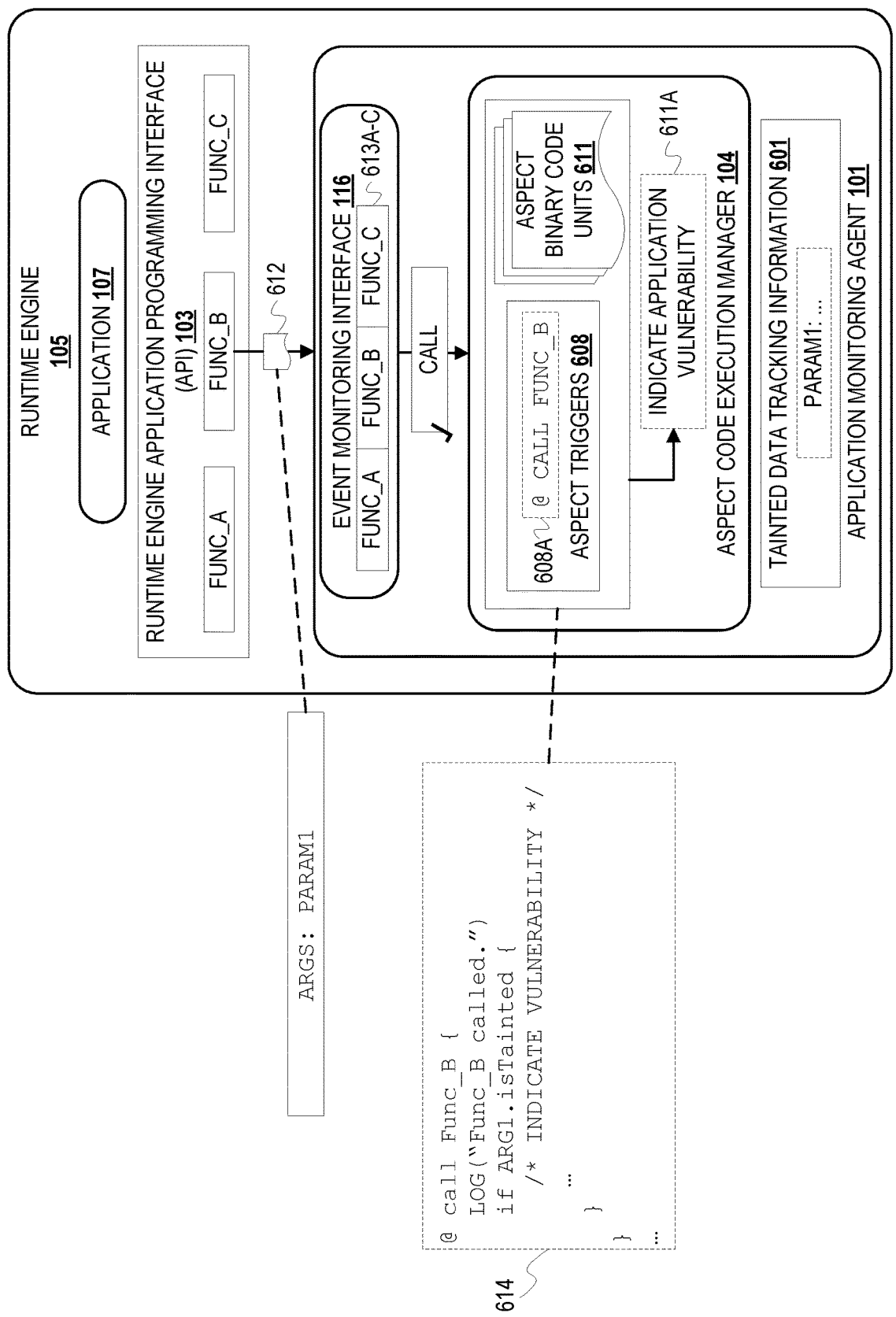
FIG. 6 is a conceptual diagram of leveraging the AOP language for runtime detection of application vulnerabilities without modifying code units of the application under analysis.

FIG. 6 is a conceptual diagram of leveraging the AOP language for runtime detection of application vulnerabilities without modifying code units of the application under analysis. FIG. 6 depicts an example in which the AOP language is used to implement aspects which facilitate vulnerability analysis of an application, though the AOP language can be leveraged for general application monitoring or performing other types of analyses. The agent 101 on which the aspect code execution manager 104 and event monitoring interface 116 execute is loaded into the runtime engine 105 provided for execution of the application 107 as described in reference to FIG. 1. The application 107 is an application written in a high-level programming language. For example, the application 107 can be a Java application, a JavaScript application, etc. The same program written in the AOP language can thus be leveraged for vulnerability analysis of the application 107 whether the application 107 is a Java application, a JavaScript application, or an application written in another high-level programming language.

In this example, the agent 101 monitors for example target functions of the API 103 named "Func_A," "Func_B," and "Func_C," respectively. FIG. 6 depicts hooks 613A-C which the event monitoring interface 116 has created for the target functions by which the agent 101 "monitors" for events, where the hooks 613A-C may be hooks which associate pointers corresponding to the events and respective event handling functions, callbacks which were registered for the respective target functions, etc. as described in reference to FIG. 1 and FIG. 3. The agent 101 also maintains tainted data tracking information ("tracking information") 601. The tracking information 601 comprises information about data which the aspect code execution manager 104 determined to be tainted based on analysis of the events occurring during execution of the application 107 and the subsequent execution of aspect binary code units. For instance, the tracking information 601 may comprise one or more objects created for storing information about tainted data as object properties. As an example, with reference to FIG. 1, the tracking information 601 may include information about the memory allocated for the string "string1" returned from the function "make_tainted" which the aspect code execution manager 104 determined to be tainted based on evaluation of the memory allocation event against the aspect triggers 108 and subsequent aspect binary code unit execution.

The aspect code execution manager 104 can access aspect code units 614 which are also loaded into the runtime engine 105. The aspect code units 614 comprise aspect triggers 608 and aspect binary code units 611 which the aspect code execution manager 104 registered as similarly described in reference to FIG. 3. The aspect binary code units 611 comprise at least an aspect binary code unit 611A to be executed upon detection of an event which corresponds to an aspect trigger 608A, or an event with type "call" and an event criterion indicating the function name of "Func_B" (i.e., a function call to a function named "Func_B.") In this example, the aspect binary code unit 611A comprises program code for determining if data passed into the function "Func_B" as a parameter has been marked as tainted and, if so, indicating that the application 107 comprises a vulnerability due to the manipulation of tainted data which has been determined to pose a potential security threat. For instance, the instructions indicated in the aspect binary code unit 611A can correspond to instructions to determine if the tracking information 601 maintained by the agent 101 indicates that the data provided as a parameter has been marked as tainted, such as based on whether an object indicating tracking information for the data has been created and stored in association with the tracking information 601.

During execution of the application 107, the agent 101 detects that a call to the function named "Func_B" has occurred via the event monitoring interface 116. For instance, the event monitoring interface 116 can detect the function call event based on the invocation of the target function "Func_B" triggering invocation of the event handler or callback corresponding to the respective one of the hooks 613A-C. The event monitoring interface 116 obtains a context 612 associated with the function call event (e.g., as a parameter(s) and/or by calling a function of the API 103 to obtain additional execution information). The context 612 comprises contextual information about the function call event and/or contextual information about execution of the application 107 at the time of the function call event. For instance, the context 612 can include a value of a parameter (s) passed in and/or a return value from the function "Func_B." The context 612 may also indicate current stack trace information, the line of code from which execution was redirected, and thread execution information, for example. The event monitoring interface 116 determines that the call to the function named "Func_B" corresponds to an event of type "call" and communicates an indication of the call event and context 612 to the aspect code execution manager 104. The aspect code execution manager 104 evaluates the context 612 against the aspect triggers 608 to determine whether the detected function call event satisfies one of the aspect triggers 608 and thus triggers execution of a corresponding one of the aspect binary code units 611. For instance, the aspect code execution manager 104 can determine if one of the aspect triggers 608 is an aspect trigger defined for events with type "call" (i.e., function call events) with a trigger criterion indicating that the call is to a function named "Func_B."

The aspect code execution manager 104 determines that the function call event satisfies the aspect trigger 608A of the aspect triggers 608 based on the evaluation of the context 612 against the aspect triggers 608. The aspect code execution manager 104 can then determine the corresponding one of the aspect binary code units 611 which should be executed as a result of the event satisfying the aspect trigger 608A (e.g., based on a memory address determined during initial registration of the aspect code units 614 which is associated with the aspect trigger 608A). The aspect code execution manager 104 can also create a "context object" which indicates the information included in the context 612 which can be accessed during execution of the corresponding one of the aspect binary code units 611. The aspect code execution manager 104 identifies the aspect binary code unit 611A as corresponding to the detected function call event. The aspect binary code unit 611A is executed such that the aspect code execution manager 104 determines that the data passed to the function "Func_B" as a parameter, or the data referenced by "param1," indicated in the context 612 has been marked as tainted based on evaluation of the tracking information 601. The aspect code execution manager 104 can thus determine that the application 107 comprises a vulnerability based on determining that data which may have originated from a malicious or unknown source is passed as a parameter to the function "Func_B."

The aspect code execution manager 104 indicates the vulnerability of the application 107. For example, the aspect code execution manager 104 can generate a notification indicating the vulnerability, add the indication of the application vulnerability to a report generated for the application 107, etc. The aspect code execution manager 104 may also indicate at least a subset of the information included in the context 612 with the indication of the vulnerability (e.g., in the notification or report). Upon termination of the application 107, the aspect code execution manager 104 may provide a report which includes the results of the vulnerability analysis. The AOP language thus facilitates vulnerability analysis of an application, such as an application 107, without modifying code units of the application 107.

Figure 7:
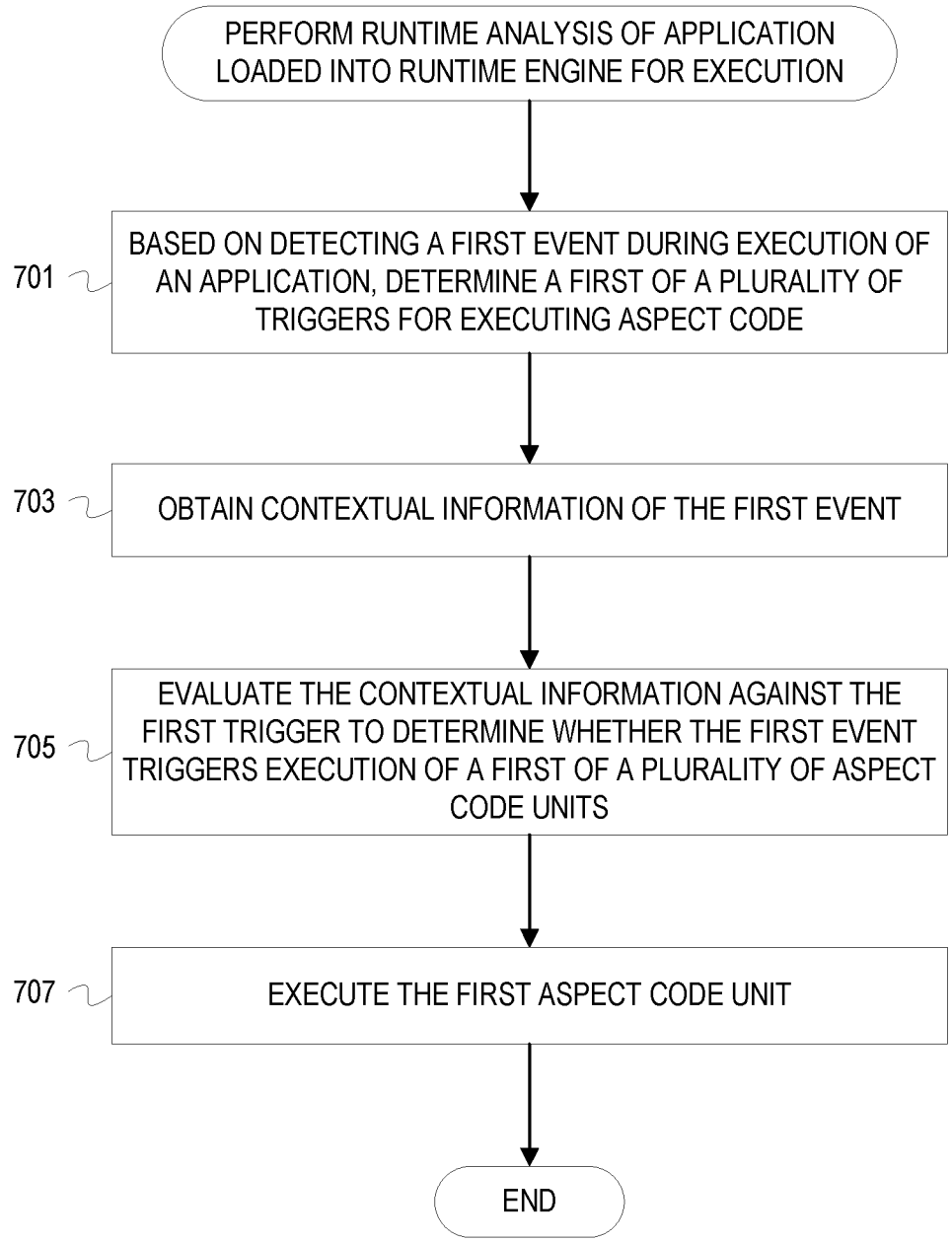
FIG. 7 is a flowchart of example operations for performing runtime analysis of an application which has been loaded into a runtime engine for execution.

FIG. 7 is a flowchart of example operations for performing runtime analysis of an application which has been loaded into a runtime engine for execution. The example operations refer to an aspect code execution manager (hereinafter "execution manager") which executes on an agent that is also loaded into the runtime engine as performing the depicted operations for consistency with FIG. 1, although naming of software and program code can vary among implementations.

At block 701, based on detecting a first event during execution of the application, the execution manager determines a first trigger of a plurality of triggers for executing aspect code. The execution manager can detect the first event based on the runtime engine invoking a target function of an associated API for which the execution manager is monitoring. For instance, the execution manager can detect the first event based on the invocation of the target function triggering an invocation of a respective event handler, callback function, etc. maintained by the execution manager. As another example, the execution manager may detect the first event based on receiving a request to evaluate the detected event. The first trigger comprises a trigger for execution of at least a first aspect code unit and indicates a code execution criterion for data and/or metadata of the first event. The execution manager can determine the first trigger based on determining a trigger which has been defined that corresponds to the detected event. For instance, the execution manager can determine a first trigger which includes an event type or event identifier which corresponds to the detected event.

At block 703, the execution manager obtains contextual information of the first event. The contextual information comprises information about execution of the application which is accessible to the execution manager at the time of the redirection of execution. For example, the contextual information can be passed as a parameter(s) into the event handler, callback function, etc. which was invoked upon detection of the first event. Alternatively or in addition, the execution manager can obtain the contextual information by invoking a function(s) of an API provided by the runtime engine. For example, the contextual information may include values of parameters, return values, stack trace information, the current line of program code of the application that is executing, and other data and/or metadata of the event.

At block 705, the execution manager evaluates the contextual information against the first trigger to determine whether the first event triggers execution of a first aspect code unit of a plurality of aspect code units. The execution manager can evaluate the data and/or metadata included in the obtained contextual information against the code execution criterion indicated in the first trigger. The first trigger also specifies the first aspect code unit, where the plurality of aspect code units have previously been loaded into the runtime engine for access by the agent. For instance, the first trigger may indicate a memory address of the aspect code unit.

At block 707, the execution manager executes the first aspect code unit. The first aspect code unit comprises an implementation of an aspect, such as logging, security checking, etc. The execution manager can execute the first aspect code unit to perform an action for monitoring and/or analysis of execution of the application. For example, the execution manager can determine that the application comprises a vulnerability based on the execution of the first aspect code unit.

Variations

While not depicted in FIG. 1, in some implementations, execution of an application can be modified by defining aspects which should execute instead of the program code of the application. For example, type coercion can be implemented in the AOP language such that upon detection of a set or comparison operation, the aspect code execution manager can perform type checking. If an incorrect type casting is identified, the aspect code execution manager can perform type coercion to correct the type casting error to prevent a runtime error which may otherwise occur. The aspect code execution manager of the agent can facilitate runtime modification of an application's execution as a result of the agent executing in the same process as the process which was created for execution of the application.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
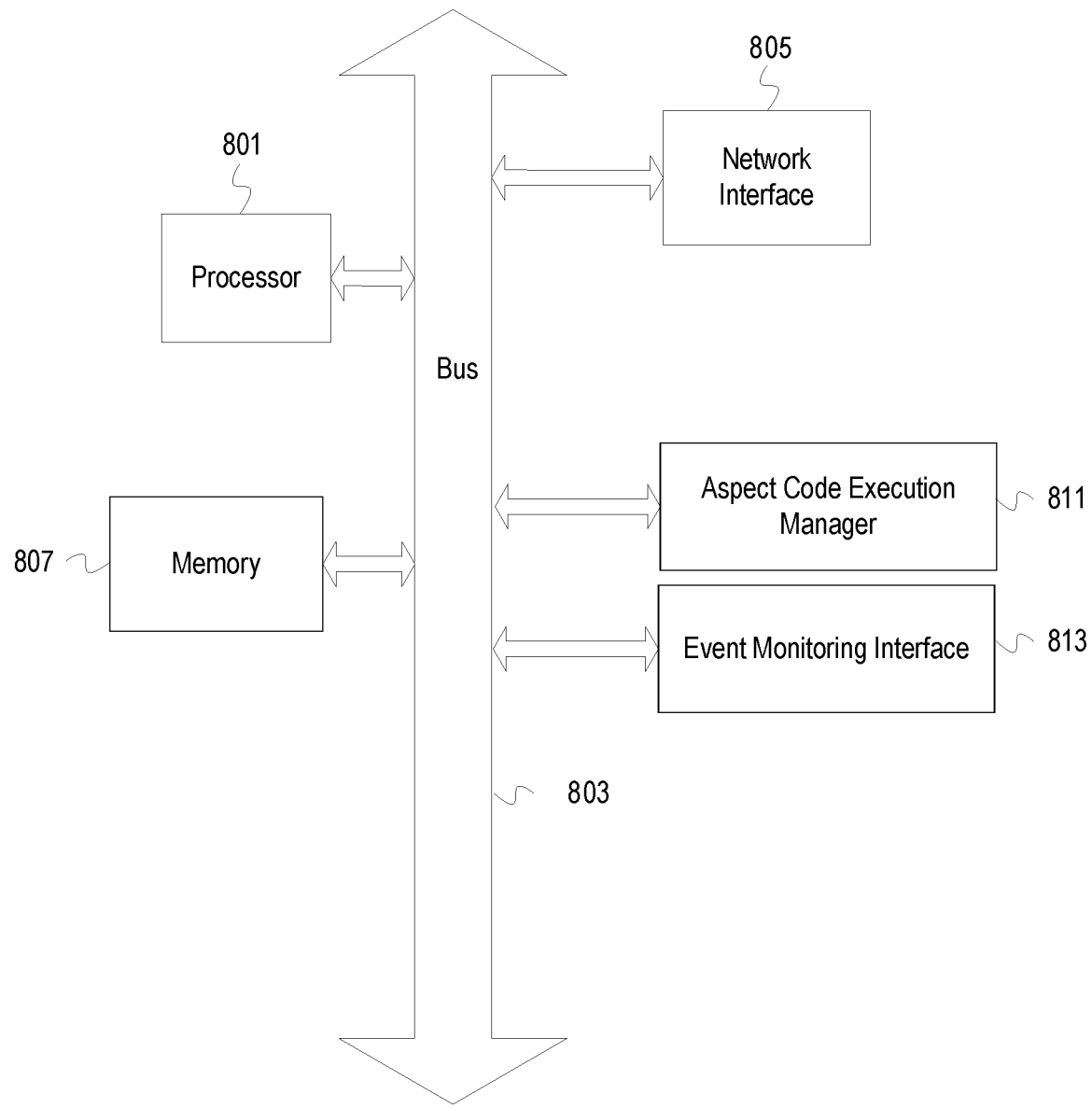
FIG. 8 depicts an example computer system with an aspect code execution manager and an event monitoring interface.

FIG. 8 depicts an example computer system with an aspect code execution manager and an event monitoring interface. The computer system includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The system also includes aspect code execution manager 811 and event monitoring interface 813. The aspect code execution manager 811 evaluates events detected during execution of an application to determine whether aspect code units should be executed to facilitate monitoring and analysis of the application at runtime. The event monitoring interface 813 detects events corresponding to invocations of target functions of a runtime engine API. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for monitoring and analyzing execution of an application based on executing aspect code units independent of the language of the runtime engine in which the application is loaded and the application as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

A method comprises, based on detecting a first event during execution of an application, an agent determining a first trigger of a plurality of triggers for executing aspect code, wherein the agent and the application execute within a runtime engine, and wherein the first trigger indicates a code execution criterion for at least one of data and metadata of the first event. The agent obtains contextual information of the first event. The agent evaluates the contextual information against the first trigger to determine whether the first event triggers execution of a first aspect code unit of a plurality of aspect code units, wherein the first trigger specifies the first aspect code unit and the plurality of aspect code units have been previously loaded into the runtime engine for access by the agent. The agent executes the first aspect code unit.

The method further comprises the agent determining that the application comprises at least a first vulnerability based, at least in part, on executing the first aspect code unit.

The plurality of aspect code units comprises a plurality of aspect binary code units, and the first aspect code unit comprises a first aspect binary code unit.

The plurality of aspect code units comprise a plurality of aspect source code units or a plurality of translated aspect code units, and the first aspect code unit comprises a first aspect source code unit or a first translated aspect code unit, and the agent executing the first aspect code unit comprises the agent interpreting the first aspect code unit.

Determining the first trigger comprises determining that a type of the first event corresponds to an event type indicated in at least a first subset of the plurality of triggers, wherein the first subset includes the first trigger, evaluating the contextual information against the first subset of triggers, and determining that the contextual information satisfies a first criterion indicated in the first trigger.

The first aspect code unit comprises an implementation of a first aspect.

The first event comprises an invocation of a first target function of an application programming interface (API) associated with the runtime engine, and detecting the first event is based, at least in part, on the runtime engine invoking the first target function during execution of the application.

The method further comprises the agent determining the plurality of triggers for executing aspect code based on load of the agent into the runtime engine.

The method further comprises detecting a second event during execution of the application, wherein the second event occurs after the agent executes the first aspect code unit, and based on detecting the second event, the agent determining a second trigger of the plurality of triggers, wherein the second trigger is within a scope of the first trigger.

The contextual information of the first event comprises at least one of a value of a parameter, a return value, a line of program code of the application, thread execution data, and stack trace information.

Obtaining the contextual information of the first event comprises obtaining the contextual information based, at least in part, on the agent invoking a first function of an API associated with the runtime engine.

One or more non-transitory machine-readable media comprise program code for performing runtime analysis of an application by an agent, the program code to detect a first event during execution of the application, wherein the agent and the application execute within a runtime engine. Contextual information of the first event is obtained based on detection of the first event, wherein the contextual information comprises at least one of data and metadata of the first event. A first trigger of a plurality of triggers is determined for execution of aspect code based, at least in part, on a type of the first event, wherein the first trigger indicates at least a first criterion for at least one of data and metadata of the first event and a first of a plurality of aspect code units, and wherein the plurality of aspect code units are also loaded into the runtime engine for access by the agent. It is determined whether the contextual information of the first event satisfies the first trigger based, at least in part, on evaluation of the contextual information against the first trigger. Based on a determination that the contextual information satisfies the first trigger, the first aspect code unit is executed or interpreted.

The first event comprises an invocation of a first target function of an application programming interface (API) associated with the runtime engine, and the detection of the first event is based, at least in part, on an invocation of the first target function by the runtime engine during execution of the application.

The program code to determine the first trigger comprises program code to determine that the type of the first event corresponds to an event type indicated in at least a first subset of the plurality of triggers, wherein the first subset includes the first trigger, evaluate the contextual information against the first subset of triggers, and determine that the contextual information satisfies a first criterion indicated in the first trigger.

An apparatus comprises a processor and a machine-readable medium having program code executable by the processor in a runtime engine to cause the apparatus to, based on detection of a first event during execution of an application in the runtime engine, determine a first trigger of a plurality of triggers for executing aspect code, wherein the first trigger indicates a code execution criterion for at least one of data and metadata of the first event. Contextual information of the first event is obtained. The contextual information is evaluated against the first trigger to determine whether the first event triggers execution of a first aspect code unit of a plurality of aspect code units, wherein the first trigger specifies the first aspect code unit and the plurality of aspect code units have been previously loaded into the runtime engine. The first aspect code unit is executed.

The apparatus further comprises program code executable by the processor to cause the apparatus to determine that the application comprises at least a first vulnerability based, at least in part, on the execution of the first aspect code unit.

The program code executable by the processor to cause the apparatus to determine the first trigger comprises program code executable by the processor to cause the apparatus to determine that a type of the first event corresponds to an event indicated in at least a first subset of the plurality of triggers, wherein the first subset includes the first trigger, evaluate the contextual information against the first subset of triggers, and determine that the contextual information satisfies a first criterion indicated in the first trigger.

The first aspect code unit comprises an implementation of a first aspect.

The plurality of aspect code units comprises a plurality of aspect binary code units, and the first aspect code unit comprises a first aspect binary code unit.

The plurality of aspect code units comprise a plurality of aspect source code units or a plurality of translated aspect code units, and the first aspect code unit comprises a first aspect source code unit or a first translated aspect code unit, and the program code executable by the processor to cause the apparatus to execute the first aspect code unit comprises program code executable by the processor to cause the apparatus to interpret the first aspect code unit.

What is claimed is:

1. A method comprising:
    loading into a runtime engine an agent and a plurality of aspect code units for access by the agent;
    detecting, by the agent, a first event during execution of an application loaded into the runtime engine, wherein the first event corresponds to invocation of an application programming interface (API) of the runtime engine;

determining, by the agent, a first trigger of a plurality of triggers for executing aspect code that corresponds to the first event,
wherein the first trigger indicates a code execution criterion for at least one of data and metadata of the first event;
obtaining, by the agent, contextual information of the first event that comprises at least one of data and metadata of the first event;
evaluating, by the agent, the contextual information against the code execution criterion of the first trigger to determine whether the first event triggers execution of a first aspect code unit of the plurality of aspect code units, wherein the first trigger specifies the first aspect code unit; and
executing the first aspect code unit to perform an action for at least one of monitoring and analysis of the application.

2. The method of claim 1, further comprising determining by the agent that the application comprises at least a first vulnerability based, at least in part, on executing the first aspect code unit.

3. The method of claim 1, wherein the plurality of aspect code units comprises a plurality of aspect binary code units, and wherein the first aspect code unit comprises a first aspect binary code unit.

4. The method of claim 1, wherein the plurality of aspect code units comprise a plurality of aspect source code units or a plurality of translated aspect code units, and wherein the first aspect code unit comprises a first aspect source code unit or a first translated aspect code unit, and wherein executing the first aspect code unit comprises interpreting the first aspect code unit.

5. The method of claim 1, wherein determining the first trigger comprises:
determining a type of the first event; and
determining that the type of the first event corresponds to an event type indicated in at least a first subset of the plurality of triggers, wherein the first subset includes the first trigger,
wherein evaluating the contextual information against the code execution criterion of the first triggers to determine whether the first event triggers execution of the first aspect code unit comprises determining whether the contextual information satisfies the code execution criterion indicated in the first trigger.

6. The method of claim 1, wherein the first aspect code unit comprises an implementation of a first aspect.

7. The method of claim 1, further comprising creating an association between a first target function of the API associated with the runtime engine and an event handler function of the agent, and wherein detecting the first event is based, at least in part, on the runtime engine invoking the first target function during execution of the application.

8. The method of claim 1, further comprising the agent determining the plurality of triggers for executing aspect code based on load of the agent into the runtime engine.

9. The method of claim 1, further comprising:
detecting a second event during execution of the application, wherein the second event occurs after the agent executes the first aspect code unit; and
based on detecting the second event, the agent determining a second trigger of the plurality of triggers, wherein the second trigger is within a scope of the first trigger.

10. The method of claim 1, wherein the contextual information of the first event comprises at least one of a value of a parameter, a return value, a line of program code of the application, thread execution data, and stack trace information.

11. The method of claim 1, wherein obtaining the contextual information of the first event comprises obtaining the contextual information based, at least in part, on the agent invoking a first function of the API associated with the runtime engine.

12. One or more non-transitory machine-readable media comprising program code for performing runtime analysis of an application by an agent, the program code to:
based on load of the agent and a plurality of aspect code units for access by the agent into a runtime engine, detect a first event during execution of the application, wherein the agent and the application execute within the runtime engine, wherein the first event corresponds to invocation of an application programming interface (API) of the runtime engine;
obtain contextual information of the first event based on detection of the first event, wherein the contextual information comprises at least one of data and metadata of the first event;
determine a first trigger of a plurality of triggers for execution of aspect code that corresponds to the first event based, at least in part, on a type of the first event, wherein the first trigger indicates at least a first criterion for at least one of data and metadata of the first event and a first aspect code unit of a plurality of aspect code units,
wherein the plurality of aspect code units are also loaded into the runtime engine for access by the agent;
determine whether the contextual information of the first event satisfies the first criterion indicated by the first trigger based, at least in part, on evaluation of the contextual information against the first criterion; and
based on a determination that the contextual information satisfies the first criterion corresponding to the first trigger, execute or interpret the first aspect code unit to perform an action for at least one of monitoring and analysis of the application.

13. The non-transitory machine-readable media of claim 12, wherein the program code further comprises instructions to create an association between a first target function of the API associated with the runtime engine and a function of the agent, and wherein the detection of the first event is based, at least in part, on an invocation of the first target function by the runtime engine during execution of the application.

14. The non-transitory machine-readable media of claim 12, wherein the program code to determine the first trigger comprises program code to:
determine a type of the first event; and
determine that the type of the first event corresponds to an event type indicated in at least a first subset of the plurality of triggers, wherein the first subset includes the first trigger.

15. An apparatus comprising:
a processor; and
a non-transitory machine-readable medium having program code executable by the processor in a runtime engine to cause the apparatus to,
detect a first event during execution of an application in the runtime engine, wherein the first event corresponds to invocation of an application programming interface (API) of the runtime engine;

determine a first trigger of a plurality of triggers for executing a corresponding plurality of aspect code units that have been loaded into the runtime engine, wherein the first trigger indicates a code execution criterion for at least one of data and metadata of the first event;

obtain contextual information of the first event that comprises at least one of data and metadata of the first event;

evaluate the contextual information against the code execution criterion of the first trigger to determine whether the first event triggers execution of a first aspect code unit of a plurality of aspect code units, wherein the first trigger specifies the first aspect code unit; and execute the first aspect code unit to perform an action for at least one of monitoring and analysis of the application.

16. The apparatus of claim 15, further comprising program code executable by the processor to cause the apparatus to determine that the application comprises at least a first vulnerability based, at least in part, on the execution of the first aspect code unit.

17. The apparatus of claim 15, wherein the program code executable by the processor to cause the apparatus to determine the first trigger comprises program code executable by the processor to cause the apparatus to:

determine a type of the first event; and determine that the type of the first event corresponds to an event indicated in at least a first subset of the plurality of triggers, wherein the first subset includes the first trigger, wherein the instructions executable by the processor to cause the apparatus to evaluate the contextual information against the first trigger to determine whether the first event triggers execution of the first aspect code unit comprise instructions executable by the processor to cause the apparatus to determine whether the contextual information satisfies the code execution criterion indicated in the first trigger.

18. The apparatus of claim 15, wherein the first aspect code unit comprises an implementation of a first aspect.

19. The apparatus of claim 15, wherein the plurality of aspect code units comprises a plurality of aspect binary code units, and wherein the first aspect code unit comprises a first aspect binary code unit.

20. The apparatus of claim 15, wherein the plurality of aspect code units comprise a plurality of aspect source code units or a plurality of translated aspect code units, and wherein the first aspect code unit comprises a first aspect source code unit or a first translated aspect code unit, and wherein the program code executable by the processor to cause the apparatus to execute the first aspect code unit comprises program code executable by the processor to cause the apparatus to interpret the first aspect code unit.

* * * * *